F. M. KOLASA.
DINNER BUCKET.
APPLICATION FILED FEB. 23, 1911.
1,065,813.  Patented June 24, 1913.
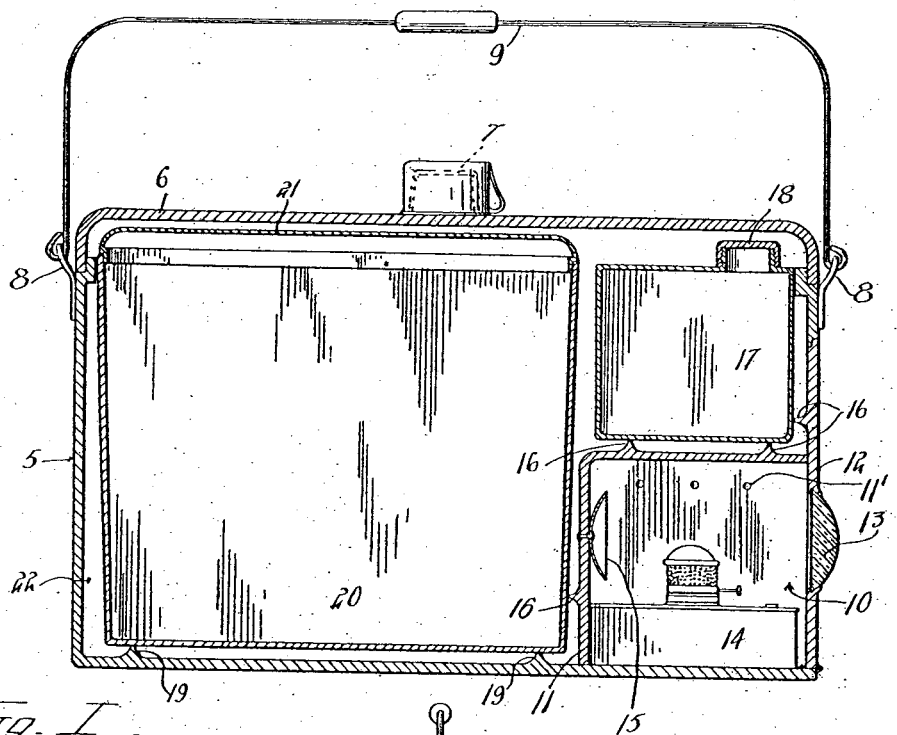
Fig. I.
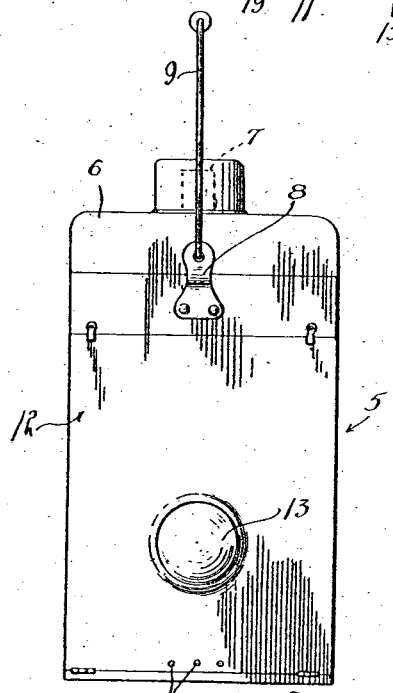
Fig. 2.
Witnesses
Inventor
F. M. Kolasa.
By
Attorneys

UNITED STATES PATENT OFFICE.

FRANK M. KOLASA, OF ELMIRA, MICHIGAN.

DINNER-BUCKET.

1,065,813.

Specification of Letters Patent.

Patented June 24, 1913.

Application filed February 23, 1911. Serial No. 610,301.

*To all whom it may concern:*

Be it known that I, FRANK M. KOLASA, a citizen of the United States, residing at Elmira, in the county of Otsego, State of Michigan, have invented certain new and useful Improvements in Dinner-Buckets; and I do hereby declare the following to be a full, clear, and exact description of the invention, such as will enable others skilled in the art to which it appertains to make and use the same.

The invention relates to a dinner bucket and more particularly to the class of buckets for receiving food and drink.

The primary object of the invention is the provision of a dinner bucket adapted to receive food and drink each of which is held in separated receptacles which will permit a free and unobstructed circulation of a heating medium to maintain the food and drink constantly hot or warm so that they are at all times in proper condition for use and at the same time afford means to enable a person to use the bucket as a lamp or lantern for lighting purposes.

A further object of the invention is the provision of a dinner bucket comprising a plurality of removable receptacles supported therein in spaced relation to each other so as to permit a free circulation of heating medium on all sides of said receptacles and a lamp compartment in which is mounted a lamp producing the heating medium, one of the outer walls of said compartment being provided with a bull's eye while the opposite wall is provided with a reflector whereby the lamp may also serve to give light.

Another object of the invention is the provision of a dinner bucket which is simple in construction, thoroughly efficient, sanitary and having its compartments removable to permit ready and easy cleansing thereof, and inexpensive in the manufacture.

With these and other objects in view the invention consists in the construction combination and arrangement of parts as will be hereinafter more fully described, illustrated in the accompanying drawings which disclose the preferred form of embodiment of the invention and as brought out in the appended claim.

In the drawings: Figure 1 is a vertical longitudinal sectional view of the improved bucket comprising the invention. Fig. 2 is an end view thereof.

Similar reference characters indicate corresponding parts throughout the several views in the drawings.

In the drawings, the numeral 5 designates the bucket which is preferably formed of metal and of rectangular shape although it may be of any other suitable material and shape and has detachably fitted thereon at its mouth portion, an air-tight cover or top 6 which carries centrally thereof a strap handle 7 so as to enable the cover or top to be placed upon and removed from the bucket. Secured exteriorly to the bucket at opposite sides thereof are ears 8 to which is connected a bail handle 9 which enables the bucket to be carried in the hand of a person for its easy transportation.

Within the lower corner of the bucket at one end thereof is formed a compartment 10 by a partition wall 11 which extends entirely across the width of the bucket. The side and end walls of the bucket 5 are provided with suitable openings 11' in communication with the compartment 10 so as to secure a circulation of air therein. To permit access to the compartment 10 there is provided a hinged door 12 which latter has mounted therein a glass panel or bull's eye 13 to enable the distribution of light from a lamp 14 or the like which is positioned within the compartment 10 of the bucket. Secured to the partitioning wall 11 in alinement with the flame of the lamp 14 is a reflector 15 which latter directs the rays of light through the glass panel or bull's eye 13 when the lamp is lighted. The openings in the side and end walls and in communication with the compartment 10 will permit the proper combustion of the fuel for heating and lighting purposes.

Rising from the upper horizontal portion of the partitioning wall 11 and projecting from the end wall thereof are bearing lugs 16 which support a receptacle 17 within the bucket 5 above the lamp compartment 10 and in spaced relation to the side and end walls and the horizontal portion of the partition wall 11 so as to form a heat circulating space to permit the heating medium to circulate around all sides of the receptacle 17 for maintaining its contents warm or heated. The receptacle 17 at its top is provided with a port closed by a removable screw cap 18 so that liquid such as coffee or the like can be introduced or discharged from the said receptacle.

Rising from the bottom of the bucket 5 are bearing lugs 19 upon which is adapted to rest a receptacle 20 which latter is adapted to receive food or victuals and which receptacle has fitted in its mouth portion an air tight cover or top 21. The receptacle 20 is of a size and is so supported within the bucket 5 to afford a heating space 22 at all sides of the same so that a free and unobstructed circulation of a heating medium is established within the bucket around all sides of both the receptacles 17 and 20 removably mounted in said bucket. The receptacles 17 and 20 respectively are of a height so as not to contact with the cover of the bucket and thereby leave a space to permit a continuous and unobstructed circulation of the heating medium produced by the lamp within the bucket.

What is claimed is—

A bucket of the character described comprising a casing including a bottom, side walls and end walls, one of said end walls having a removable portion provided with a spacing lug upon its inner face, spacing lugs upon the upper face of the bottom, an L-shaped partition wall in one end of the casing to form a lamp compartment, the horizontal portion of the wall engaging against the removable portion of the adjacent end, spacing lugs formed upon the upper face of the horizontal portion of the partition, a receptacle positioned upon the last mentioned lugs, and against the lug on the inner face of the end wall, a receptacle positioned upon the lugs on the bottom of the casing and against the lugs of the vertical portion of the partition, a lamp within the lamp compartment, a reflector carried by the vertical portion of the partition, a bull's eye in the removable portion and a cover for said casing.

In testimony whereof, I affix my signature, in presence of two witnesses.

FRANK M. KOLASA.

Witnesses:
 DORR D. BUELL,
 GEO. W. WECKETT.

---

Copies of this patent may be obtained for five cents each, by addressing the "Commissioner of Patents, Washington, D. C."